(12) United States Patent
Asao et al.

(10) Patent No.: US 6,455,958 B1
(45) Date of Patent: Sep. 24, 2002

(54) AC GENERATOR FOR VEHICLE

(75) Inventors: Yoshihito Asao; Yoshihiro Shinosaka; Kyoko Higashino; Katsumi Adachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/446,454

(22) PCT Filed: Jul. 7, 1997

(86) PCT No.: PCT/JP97/02346
§ 371 (c)(1),
(2), (4) Date: Dec. 22, 1999

(87) PCT Pub. No.: WO99/03190
PCT Pub. Date: Jan. 21, 1999

(51) Int. Cl.⁷ .................................................. H02K 5/24
(52) U.S. Cl. .......................................... 310/51; 310/263
(58) Field of Search ............................. 310/51, 62, 63, 310/263, 258, 261; 29/596, 598

(56) References Cited

U.S. PATENT DOCUMENTS

| 4,463,275 A | * | 7/1984 | Ragaly ........................ 310/78 |
| 4,614,889 A | | 9/1986 | Ikegami et al. ............. 310/263 |
| 5,021,696 A | * | 6/1991 | Nelson ........................ 310/62 |
| 5,241,230 A | * | 8/1993 | Takama et al. ............... 310/62 |
| 5,977,668 A | * | 11/1999 | Yoshioka ..................... 310/62 |

FOREIGN PATENT DOCUMENTS

| JP | 56-20369 | 2/1981 | ............ H02K/9/06 |
| JP | 57-3376 | 1/1982 | ............ H02K/19/22 |
| JP | 59-216452 | 12/1984 | ............ H02K/17/16 |
| JP | 60-2049 | 1/1985 | ............ H02K/9/06 |
| JP | 62-244245 | 10/1987 | ............ H02K/9/19 |
| JP | 64-001451 | 1/1989 | |
| JP | 3-21965 | 3/1991 | ............ H02K/9/06 |
| JP | 4-47365 | 4/1992 | ............ H02K/5/24 |
| JP | 5-038111 | 2/1993 | |
| JP | 7-222415 | 8/1995 | ............ H02K/19/22 |

* cited by examiner

*Primary Examiner*—Joseph Waks
(74) *Attorney, Agent, or Firm*—Sughrue Mion, PLLC (57) ABSTRACT

The present invention is to obtain a vehicle alternator capable of effectively reducing an electromagnetic noise.

The vehicle alternator includes steel sheet fans mounted to poles by being welding to the end surfaces of the poles on the inner peripheral sides of the fans at a plurality of positions in a peripheral direction and a bobbin around which a coil is wound and which is attached in the poles and further includes elastic matters interposed between the fans and the poles on the outer peripheral side of the welding portions where the fans are welded to the poles.

16 Claims, 11 Drawing Sheets

AC GENERATOR FOR VEHICLE

TECHNICAL FIELD

The present invention relates to the reduction of an electromagnetic noise generated by the magnetic vibration of the claw-shaped magnetic pole portion of a vehicle alternator having a Lundell-type rotor.

BACKGROUND ART

Figure 17:
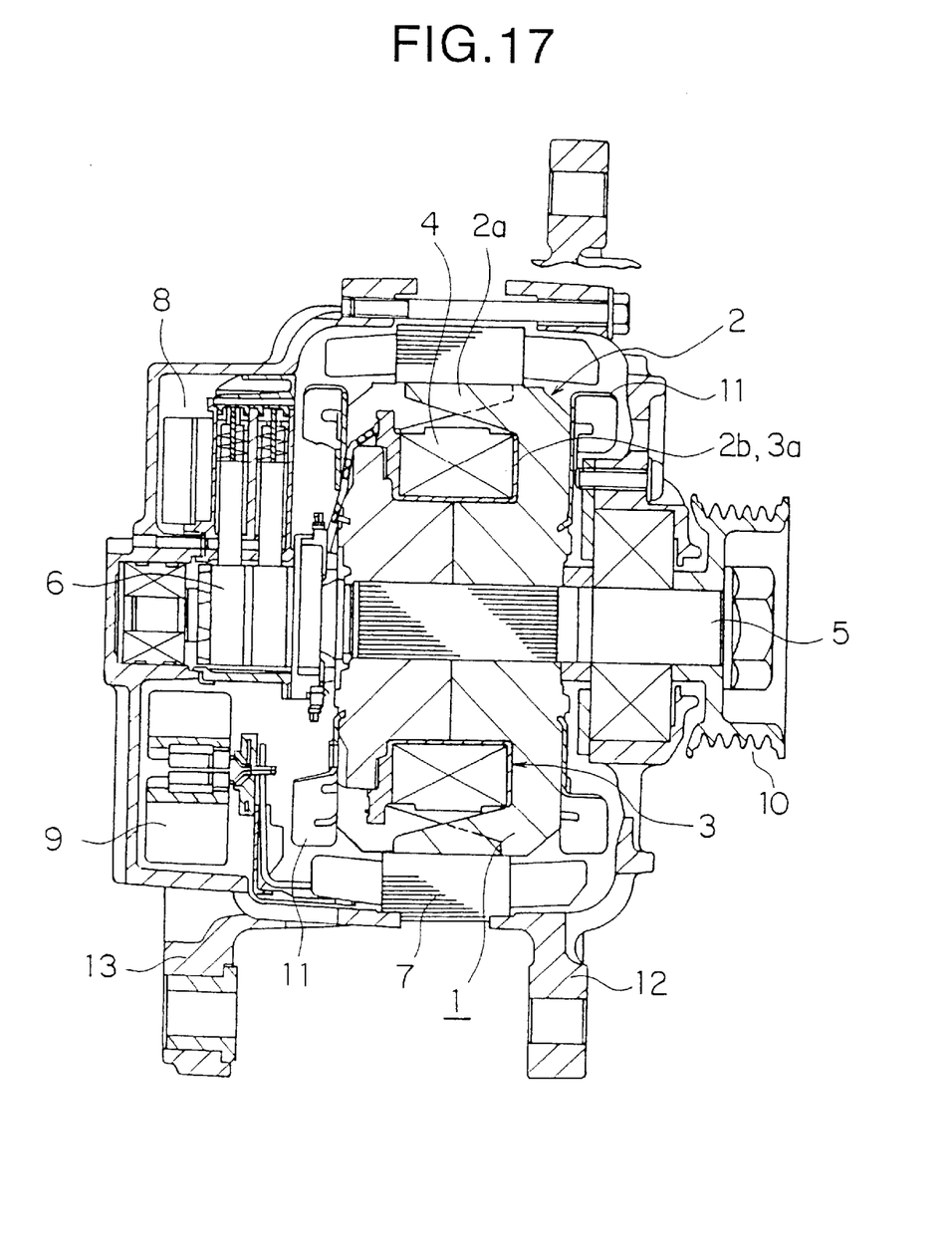
FIG. 17 is a sectional view showing a conventional alternator.
Figure 18:
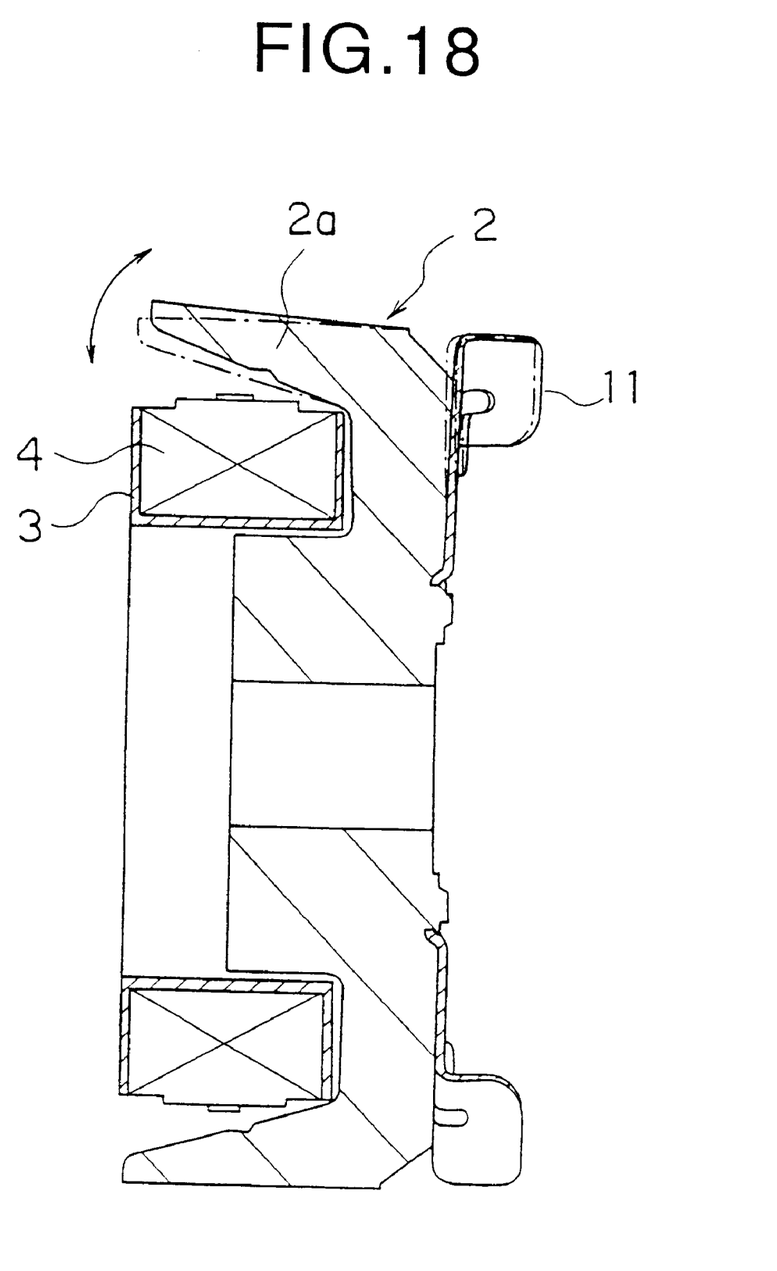
FIG. 18 is an enlarged sectional view showing the vicinity of the poles and bobbin of the rotor in the conventional alternator.

FIG. 17 is a view showing the arrangement of a conventional vehicle alternator, and FIG. 18 is an enlarged sectional view showing the vicinity of the poles and bobbin of a rotor.

In the respective drawings, a rotor 1 is composed of a pair of claw-shaped poles 2 each having a plurality of claws 2a formed thereto, a bobbin 3 around which a coil 4 is wound, a rotary shaft 5 and a slip ring 6. The pair of poles 2 are disposed in confrontation with each other so that the claws 2a are meshed with each other and the rotary shaft 5 is fixed by being press fitted into the axial center position of the claws 2a. The inner peripheries 2b of the base portions of the claws 2a are abutted against the outer periphery 3a of the bobbin 3 which is fixed between the pair of poles 2 by the press fitting force of the rotary shaft 5. A stator 7 is disposed to the outer peripheries of the poles 2 with a slight interval defined therebetween. A voltage controller is mounted to a brush holder 8. A pulley 10 is mounted to the rotary shaft 5 integrally therewith and fans 11 are mounted to the end surfaces of the poles 2 integrally therewith. A front bracket 12 and a rear bracket 13 are disposed to surround the rotor 1 while journaling the rotary shaft 5.

Next, operation of the conventional alternator will be described.

A current is supplied to the coil 4 through the brush holder 8 and the slip ring 6 and at the same time the pulley 10 is driven in rotation by a belt to thereby permit the stator 7 to generate an alternating current. The alternating current is converted into a direct current by a rectifier 9. While the alternator is in operation, a magnetic attracting force is imposed on the poles 2 by the magnetic flux in the interval between the poles 2 and the stator 7. The magnetic flux continuously changes as a time elapses and the magnetic attracting force acts on the poles 2 as a swaying force so that the poles 2 are swayed as shown by the arrow in FIG. 18. The resonant vibration of the poles 2 generates a so-called electromagnetic noise. Since the conventional vehicle alternator is arranged as described above, there is a problem that the magnetic attracting force acts to sway the poles 2 to thereby generate the electromagnetic noise.

Figure 19:
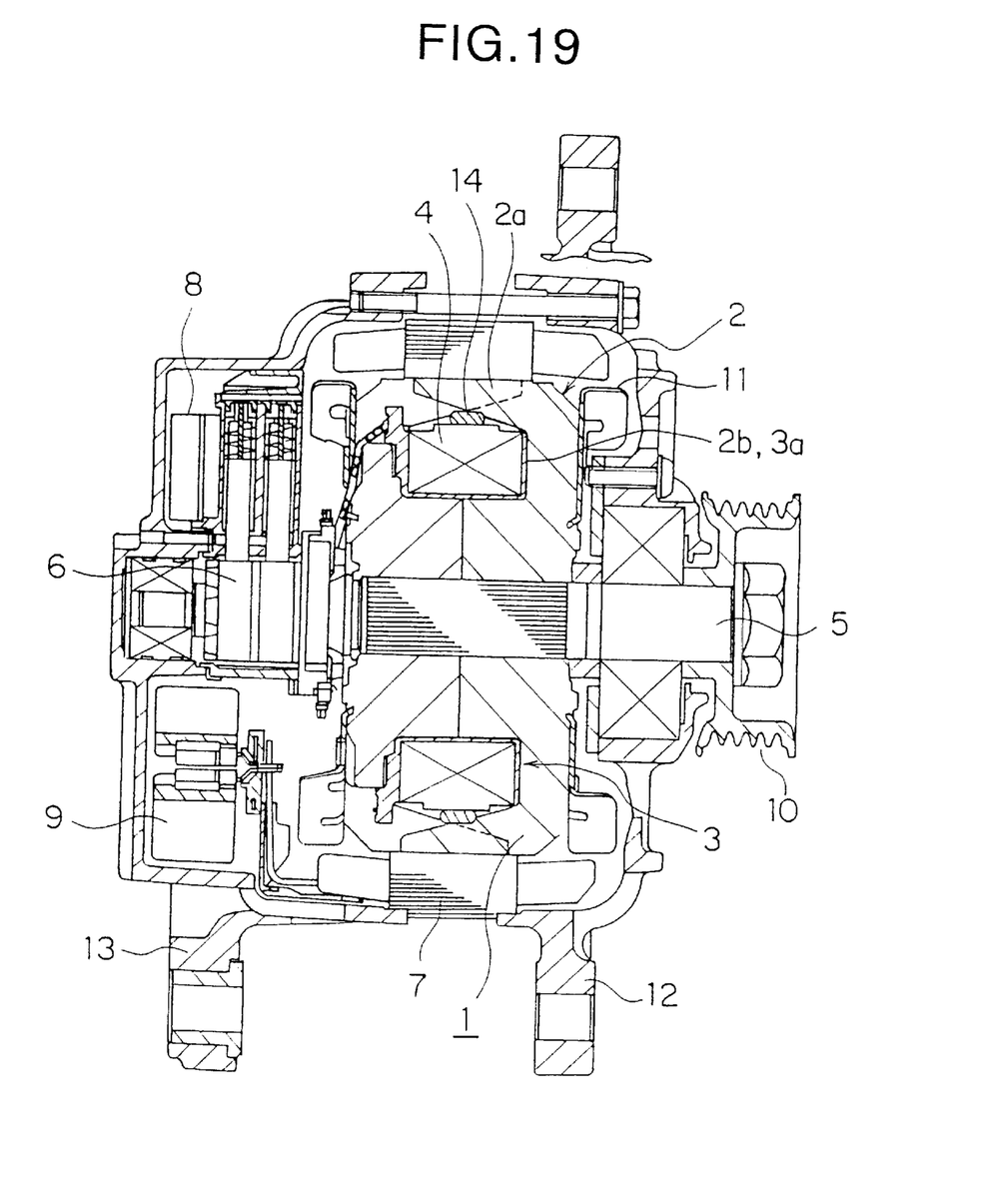
FIG. 19 is a sectional view showing another example of the conventional alternator.

As means for reducing the electromagnetic noise, there is conventionally employed such a countermeasure that a ring 14 is abutted against the insides of the claws 2a to increase the rigidity of the poles 2 and the resonant vibration of the poles 2 is shifted to a high frequency region as shown in FIG. 19. However, only the shift of the resonant vibration to the high frequency region is not any solution to the root of the matter for reducing the level of the electromagnetic noise and further since the number of parts is increased, a cost is made expensive.

DISCLOSURE OF THE INVENTION

An object of the present invention made to solve the above problems is to provide a vehicle alternator capable of effectively reducing an electromagnetic noise.

A vehicle alternator according to the present invention including steel sheet fans mounted to poles by being welding to the end surfaces of the poles on the inner peripheral sides of the fans at a plurality of positions in a peripheral direction and a bobbin around which a coil is wound and which is attached in the poles is arranged such that it includes elastic matters interposed between the fans and the poles on the outer peripheral side of the welding portions where the fans are welded to the poles.

A vehicle alternator according to the present invention including steel sheet fans mounted to poles by being welding to the end surfaces of the poles on the inner peripheral sides of the fans at a plurality of positions in a peripheral direction and a bobbin around which a coil is wound and which is attached in the poles is arranged such that it includes vibration-proof rings mounted to the outer peripheral edges of the poles on the fan side thereof and elastic matters interposed between the poles and the vibration-proof rings.

A method of manufacturing a vehicle alternator according to the present invention includes the steps of applying the paste of an elastic material to fans on the outer peripheral side of the welding positions where the fans are welded to poles, integrating the fans with the poles by welding the fans to the poles while pressing the coated surfaces of the elastic material against the end surfaces of the poles and curing the elastic material.

BEST MODE FOR CARRYING OUT THE INVENTION

Embodiments of the present invention will be described with reference to the drawings.

Embodiment 1

Figure 1:
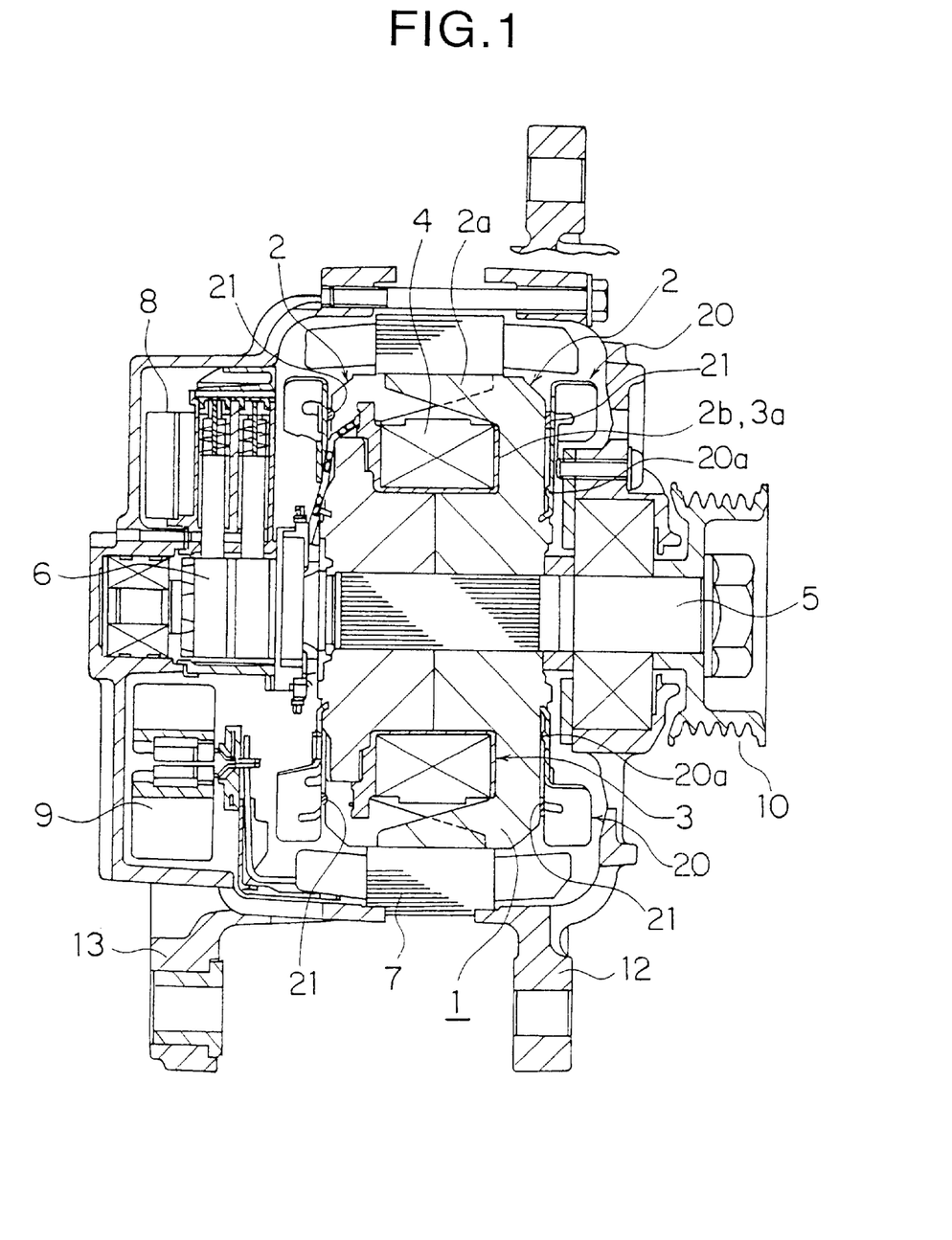
FIG. 1 is a sectional view showing an alternator according to an embodiment 1 of the present invention.

FIG. 1 is a sectional view showing a vehicle alternator according to an embodiment 1 of the present invention.

In FIG. 1, a rotor 1 is composed of a pair of claw-shaped poles 2 each having a plurality of claws 2a formed thereto, a bobbin 3 around which a coil 4 is wound, a rotary shaft 5 and a slip ring 6. The pair of poles 2 are disposed in confrontation with each other so that the claws 2a are meshed with each other and the rotary shaft 5 is fixed by being press fitted into the axial center position of the claws 2a. The inner peripheries 2b of the base portions of the claws 2a are abutted against the outer periphery 3a of the bobbin 3 which is fixed between the pair of poles 2 by the press fitting force of the rotary shaft 5. Fans 20 are mounted to the poles 2 by being welded to the end surfaces of the poles 2 at the welding portions 20a on the sides of the inner peripheries thereof. Elastic matters 21 are interposed between the poles 2 and the fans 20 on the outer peripheral sides of the welding portions 20a. A stator 7 is disposed to the outer peripheries of the poles 2 with a slight interval defined therebetween. A voltage controller is mounted to a brush holder 8. A pulley 10 is mounted to the rotary shaft 5 integrally therewith. A front bracket 12 and a rear bracket 13 are disposed to surround the rotor 1 while journaling the rotary shaft 5.

Figure 2:
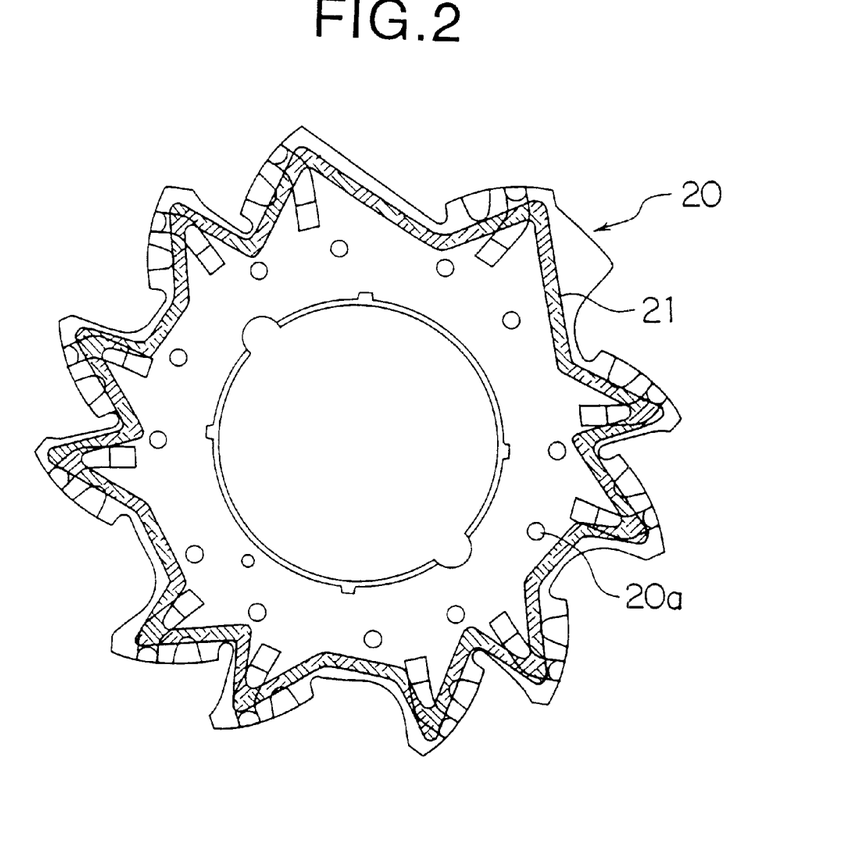
FIG. 2 is a view showing a fan applied to the alternator according to the embodiment 1 of the present invention when it is viewed from a rotor side.
Figure 3:
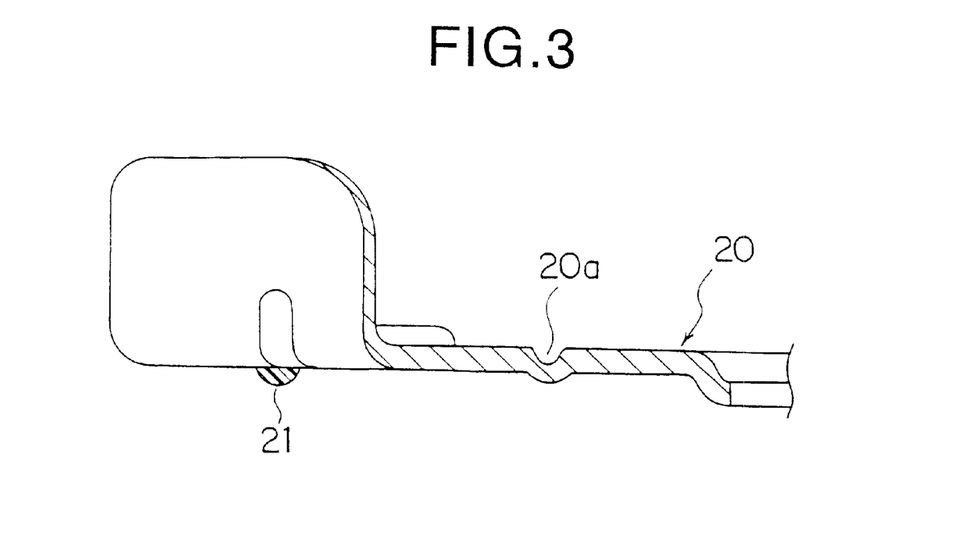
FIG. 3 is a sectional view showing the main portion of the fan applied to the alternator according to the embodiment 1 of the present invention.

Each of the fans 20 is made of a steel sheet and composed of a disc portion and a fan portion formed to the outer periphery of the disc portion integrally therewith. As shown in FIG. 2 and FIG. 3, a plurality of the welding portions 20a, which project toward the surface of the fan 20 confronting the poles 2, are disposed to the inner periphery of the fan 20 at plurality of positions. An elastic matter 21 is formed to the surface of the fan 20 confronting the poles 2 at the entire outer peripheral edge thereof in a line shape. The elastic matter 21 is formed in such a manner that the paste of a silicone rubber resin such as, for example, TSE3212 (made by Toshiba Silicone Co. Ltd.) is applied to the surface of the fan 20 confronting the pole 2 in the vicinity of the entire outer peripheral edge thereof in the line shape and thereafter heated and cured.

Figure 4:
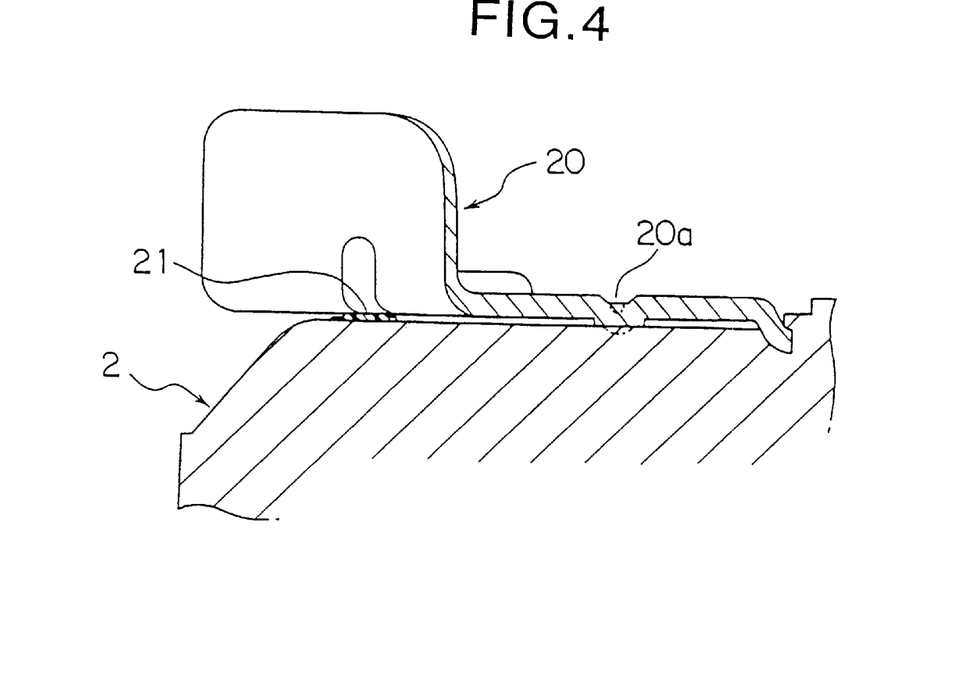
FIG. 4 is a sectional view of the main portion of the fan applied to the alternator according to the embodiment 1 of the present invention and shows how the fan is mounted.

The fan 20 to which the elastic matter 21 is formed is applied to and positioned at the end surfaces of the poles 2 and thereafter mounted to the poles 2 integrally therewith by being welded at welding portions 20a while being press fitted as shown in FIG. 4. At the time, the elastic matter 21 is interposed between the poles 2 and the fan 20 in the state that it is pressed and deformed.

Figure 5:
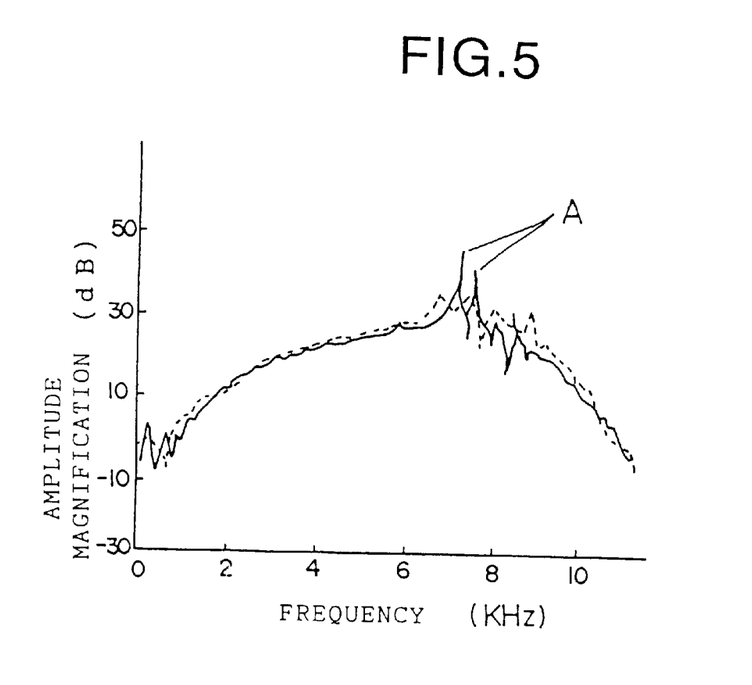
FIG. 5 is a graph showing the result of measurement of the amplitude magnification of poles in a rotor which is applied to the alternator according to the embodiment 1 of the present invention.

FIG. 5 shows the result of measurement of the amplitude magnification of the poles 2 measured by an impulse hammer when the rotor 1 is assembled using the poles 2 which are integrated with the fans 20 through the elastic matters 21. In FIG. 5, a dotted line shows the embodiment 1 of the present invention and a solid line shows a comparative example without the elastic matters 21.

In FIG. 5, it is observed that the comparative example without the elastic matters 21 has a steep peak A in the frequency region of 7–8 kHz where an electromagnetic noise is generated when an actual device is mounted, whereas the peak is damped in the frequency region of 7–8 kHz in the embodiment 1 provided with the elastic matters 21.

As described above, according to the embodiment 1, since the elastic matters 21 are interposed between the poles 2 and the fans 20 which are arranged integrally with each other, the magnetic vibration of the poles 2 is suppressed by the damper effect of the elasticity of the elastic matters 21 while the alternator is in operation and the electromagnetic noise can be effectively reduced.

Since the elastic matters 21 are located to the outer peripheral side of the welding portions 20a of the fans 20, the vibration of the outside diameter portions of the poles which have a large amount of amplitude can be prevented and thus the electromagnetic noise can be effectively reduced by a small amount of the elastic material.

Further, since the paste of the silicone rubber resin material is applied over the entire periphery in the line state, the silicone rubber resin material can be deposited by applying the paste with a single stroke of the brush. As a result, a working time is shorted and productivity can be improved.

Embodiment 2

In an embodiment 2, first, the paste of the silicone rubber resin material is applied to the vicinity of the entire outer peripheral edge of the surface, which confronts poles 2, of each of fans 20 in a line state. Thereafter, the fans 20 to which the silicone rubber resin material is formed are applied to and positioned at the end surfaces of the poles 2 and welded to the poles 2 at welding portions 20a while being press fitted so that the poles 2 are integrated with the fans 20. Thereafter, the thus integrally arranged poles 2 and fans 20 are heated at a predetermined temperature for a predetermined time to thereby cure the silicone rubber resin material. As a result, the assembly of the poles 2 and the fans 20 having the elastic matters 21 interposed therebetween is obtained.

An alternator capable of reducing an electromagnetic noise can be obtained by assembling an alternator using the assembly composed of the poles 2 and the fans 20 having the elastic matters 21 interposed therebetween likewise the embodiment 1.

According to the embodiment 2, since the fans 20 are integrated with the poles 2 by welding before the silicone rubber resin material applied to the fans 20 is heated and cured, even if the silicone rubber resin material is irregularly applied, the silicone rubber resin material, that is, elastic matters 21 are filled between the fans 20 and poles 2 without leaving any space when the fans 20 are mounted to the poles 2. As a result, the thickness of the silicone rubber resin material having been applied need not be accurately managed and productivity can be improved accordingly.

Further, since the elastic matters 21 are filled between the fans 20 and the poles 2 without leaving any space, there can be obtained the assembly of the poles 2 and the fans 20 with the elastic matters 21 interposed therebetween which have a secure vibration-proof effect.

Embodiment 3

Figure 6:
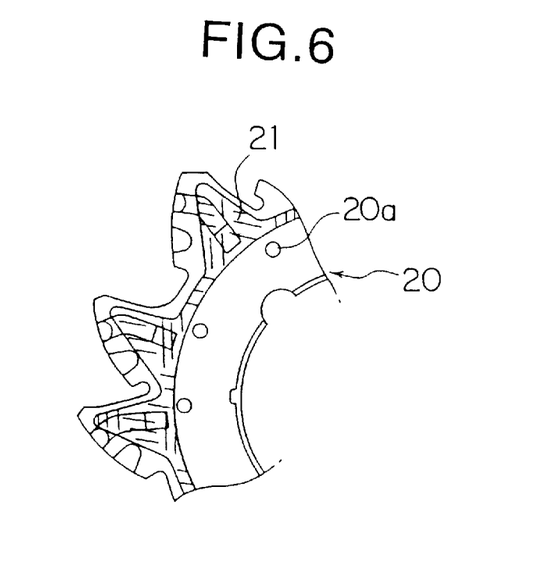
FIG. 6 is a view showing the main portion of a fan in the alternator according to an embodiment 3 of the present invention when it is viewed from a rotor side.

An embodiment 3 is arranged such that the paste of the silicone rubber resin material is applied to the large diameter portion of fans 20 in an large area as shown in FIG. 6, different from the embodiment 1 in which the paste of the silicone rubber resin material is applied to the fans 20 in the same line width in the line state.

Since the area of elastic matters 21 is increased in the embodiment 3, a large damping effect can be obtained by the elastic matters 21.

Embodiment 4

Figure 7:
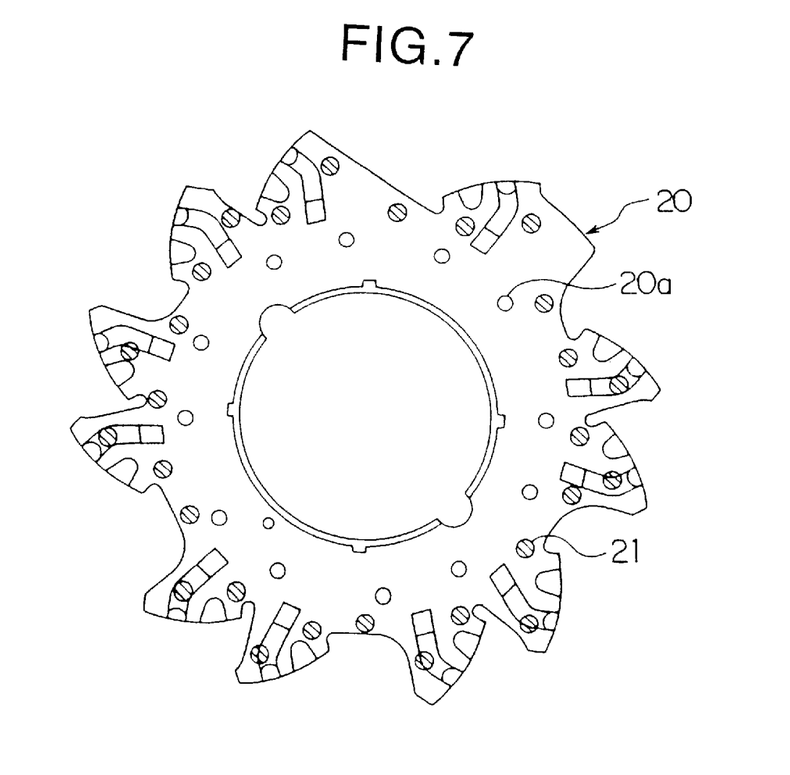
FIG. 7 a view showing a fan in the alternator according to an embodiment 4 of the present invention when it is viewed from a rotor side.

FIG. 7 a view showing a fan applied to the alternator according to an embodiment 4 of the present invention when it is viewed from a rotor side.

In the embodiment 4, the paste of the silicone rubber resin material is applied to the vicinity of the entire outer peripheral edge of the surface, which confronts poles 2, of each of fans 20 so as to make many dots of the paste and thereafter heated and cured to thereby form elastic matters 21. The other arrangement of the embodiment 4 is the same as that of the embodiment 1.

According to the embodiment 4, since a plurality of the elastic matters 21 are formed on the outer peripheral side of welding portions 20a in a peripheral direction in the dot state, when the fans 20 are integrated with the poles 2 by being welded at the welding portions 20a, the elastic matters 21 are interposed between the poles 2 and the fans 20. Thus, the magnetic vibration of the poles 2 is suppressed by the damper effect obtained from the elasticity of the elastic matters 21 and accordingly an electromagnetic noise can be effectively reduced.

Further, since the elastic matters 21 are formed to the dot state over the entire peripheries of the fans 20, even if the respective elastic matters 21 are formed to an irregular thickness, all the elastic matters 21 can be interposed between the fans 20 and the poles 2 by the deformation thereof without leaving any space when the fans 20 are mounted to the poles 2, by which a vibration-proof effect can be securely obtained.

Embodiment 5

Figure 8:
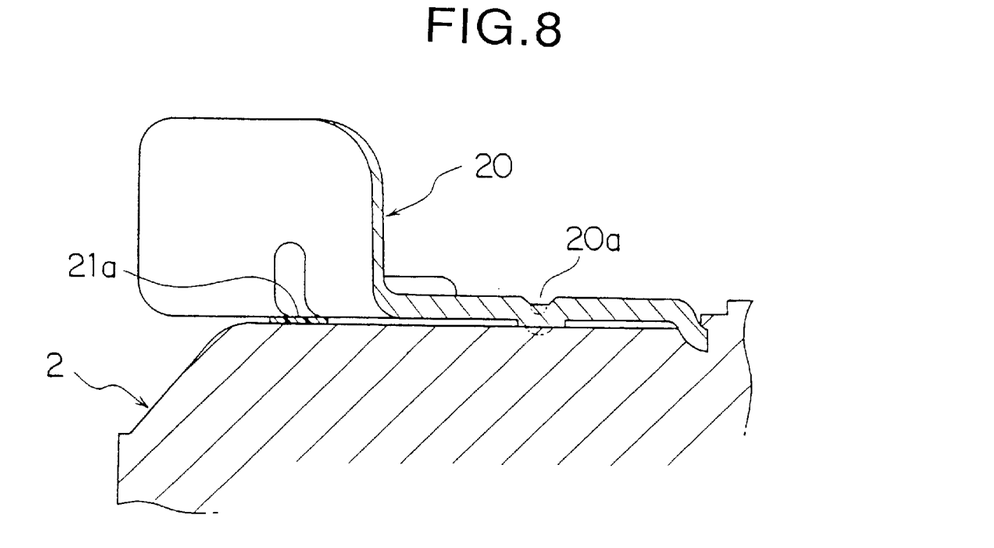
FIG. 8 is a sectional view of the main portion of a fan applied to the alternator according to an embodiment 5 of the present invention and shows how the fan is mounted.

Although the paste of the silicone rubber resin material is used as the elastic matters 21 in the embodiment 1, an embodiment 5 uses the sheet material of the silicone rubber resin material as elastic matters 21a. In the embodiment 5, the sheet material of the silicone rubber resin material such as, for example, Sarcon TR (made by Fuji Kobunshi Kogyo Kabushiki Kaisha) or the like is stamped to a ring shape and the ring-shaped elastic matters 21a are previously prepared. Then, the ring-shaped elastic matters 21a are placed on the end surfaces of poles 2 and fans 20 are welded thereto at welding portions 20a to thereby obtain an assembly of the poles 2 and the fans 20 having the elastic matters 21a interposed therebetween as shown in FIG. 8. Note, the ring-shaped elastic matters 21a are stamped to have an outside shape similar to the shape to which the paste is applied in the embodiment 1.

Therefore, the magnetic vibration of the poles 2 is suppressed by the damper effect obtained from the elasticity of the elastic matters 21a and accordingly an electromagnetic noise can be effectively reduced also in the embodiment 5.

According to the embodiment 5, since the elastic matters 21a are stamped from the sheet material, they can be simply formed to any arbitrary shape as compared with those in the embodiment 1 which are made by applying, heating and curing the paste of the silicone rubber resin material. As a result, productivity can be improved as well as the thickness of the elastic matters 21a is made uniform and a vibration-proof effect can be securely obtained. Further, when an adhesive layer is formed to a surface of the sheet material, since the ring-shaped elastic matters 21a can be tentatively fixed to the poles 2 or the fans 20, workability is improved when the poles 2 are integrated with the fans 20 and thus productively is improved.

Embodiment 6

Figure 9:
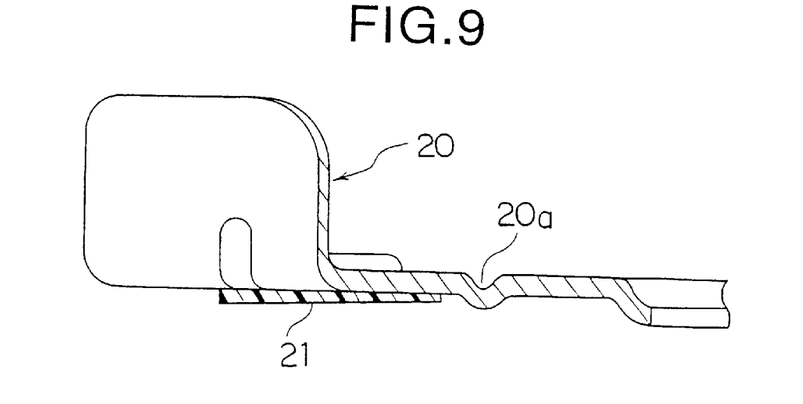
FIG. 9 is a sectional view of the main portion showing the fan applied to the alternator according to an embodiment 6 of the present invention.

Although the thickness of the elastic matters 21 are made uniform in the above respective embodiments, the thickness of the elastic matters 21 in an embodiment 6 is gradually increased in an outwardly radial direction as shown in FIG. 9.

Since the thickness of the elastic matters 21 is increased toward the outwardly radial direction in the embodiment 6, when fans 20 are integrated with poles 2, a pressurizing force, which is applied, through the elastic matters 21, to the outer peripheries of the poles 2 having a large amplitude, is increased, by which the magnetic vibration of the poles 2 is suppressed.

Figure 10:
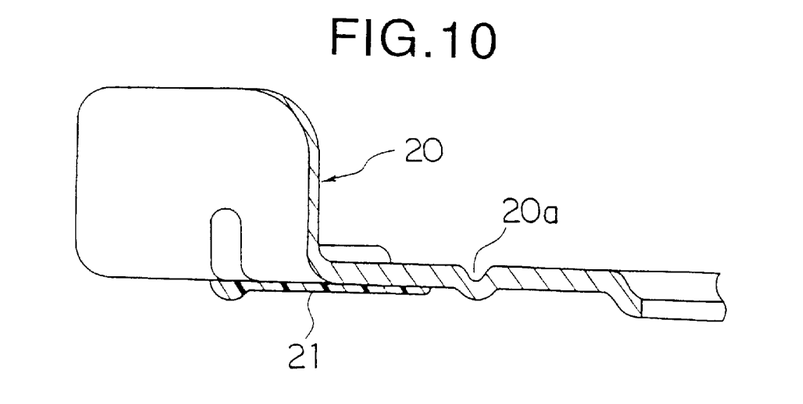
FIG. 10 is a sectional view of the main portion showing another example of the fan applied to the alternator according to an embodiment 6 of the present invention.

Note, although the thickness of the elastic matters 21 is gradually increased in the outwardly radial direction in the embodiment 6, the same advantage can be obtained even if the thickness of the elastic matters 21 is increased on the radially outside portions thereof as shown in FIG. 10.

Embodiment 7

Figure 11:
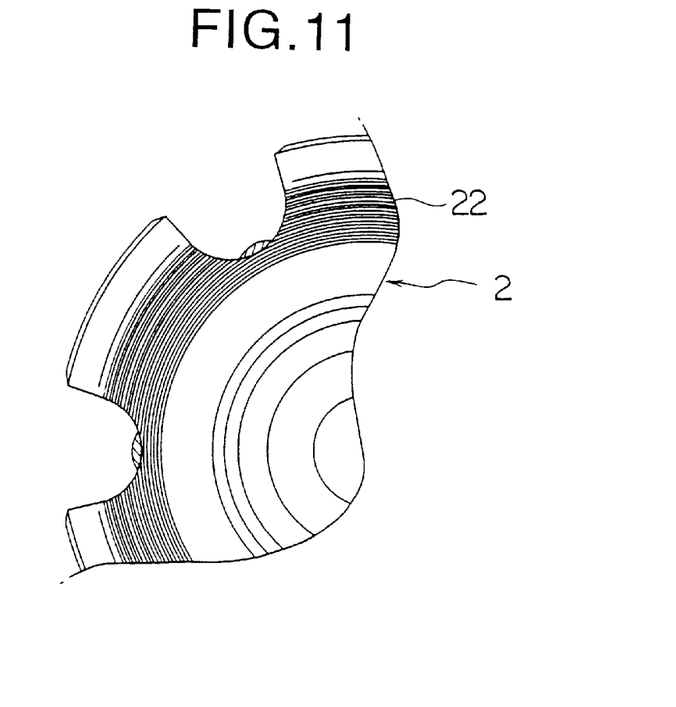
FIG. 11 is a view showing a pole applied to the alternator according to an embodiment 7 of the present invention when it is viewed from a fan side.
Figure 12:
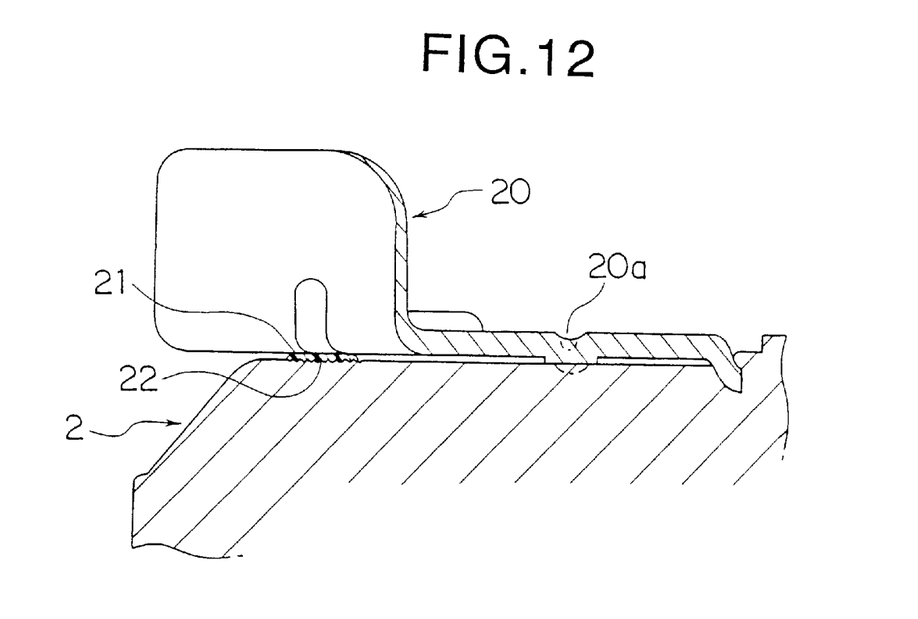
FIG. 12 is a sectional view of the main portion of a fan applied to the alternator according to the embodiment 7 of the present invention and shows how the fan is mounted.

In an embodiment 7, a multiplicity of grooves 22 are concentrically formed to the end surfaces of poles 2 on the fan side thereof as shown in FIG. 11. When the fans 20 are mounted to the poles 2, elastic matters 21 are located to the regions of the poles 2 where the grooves 22 are formed thereto as shown in FIG. 12. The other arrangement of the embodiment 7 is the same as that of the embodiment 1.

In the embodiment 7, the multiplicity of grooves 22 are formed to the end surfaces of the poles 2 and when the fans 20 are mounted to the poles 2, the elastic matters 21 come into contact with the regions of the fans 20 where the grooves 22 are formed. Thus, the areas where the elastic matters 21 are in contact with the poles 2 are increased, by which the damping effect executed by the elastic matters 21 is improved.

Embodiment 8

Figure 13:
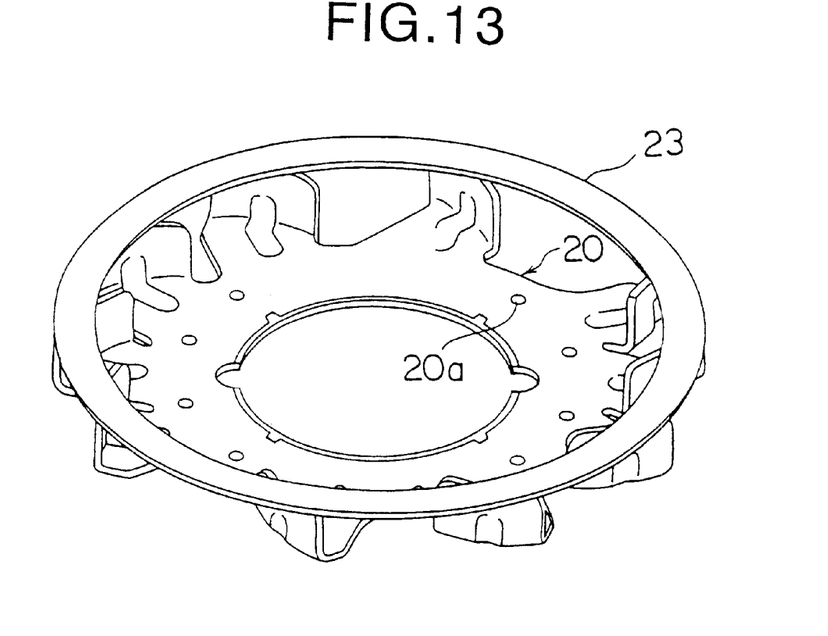
FIG. 13 is a perspective view showing a fan applied to the alternator according to an embodiment 8 of the present invention.
Figure 14:
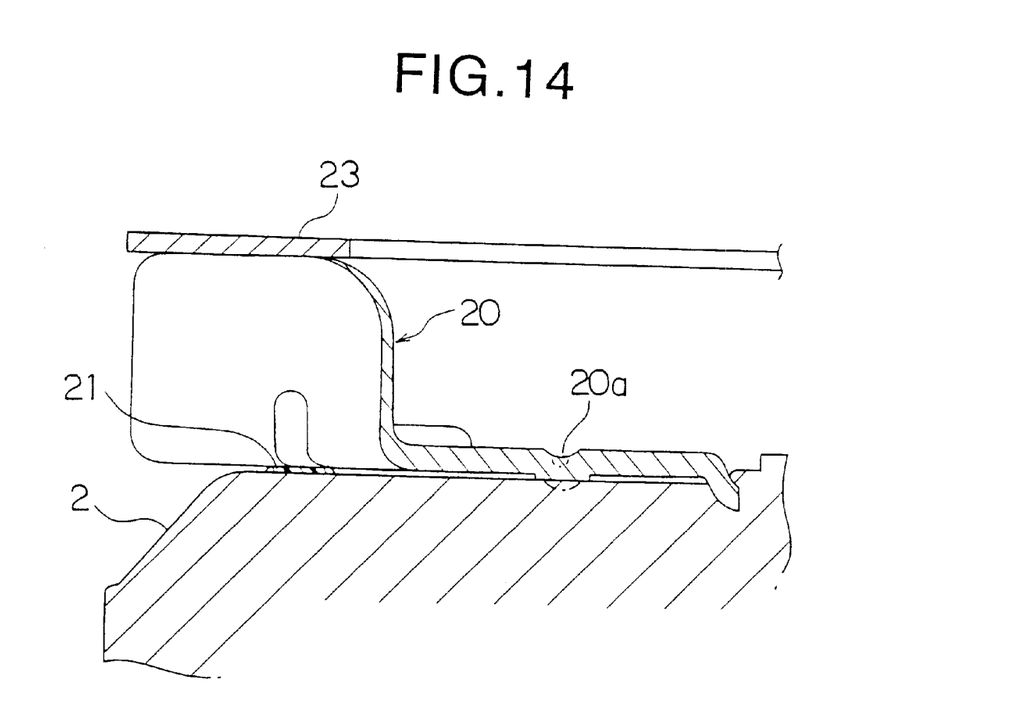
FIG. 14 is a sectional view of the main portion of a fan in the alternator according to an embodiment 8 of the present invention and shows how the fan is mounted.

In an embodiment 8, a ring-like side plate 23 is fixed to each of fans 20 by welding as a rigidity increasing member as shown in FIG. 13. Then, the fans 20 to which the side plates 23 are fixed are welded to poles 2 at welding portions 20a as shown in FIG. 14. The other arrangement of the embodiment 8 is the same as that of the embodiment 1.

In the embodiment 8, since the side plates 23 is fixed to the fans 20, the rigidity of the fans 20 is increased. Thus, when the fans 20 are mounted to the poles 2, the fans 20 are difficult to flex and a pressurizing force acting on the poles 2 through the elastic matters 21 is increased to thereby suppress the vibration of the poles 2.

Embodiment 9

Figure 15:
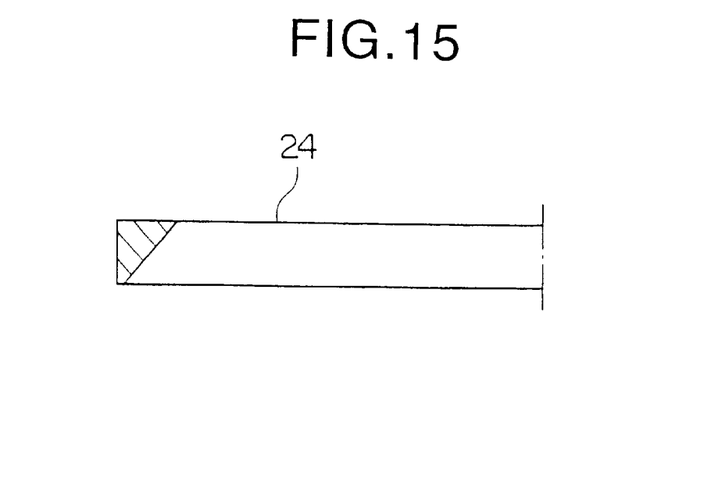
FIG. 15 is a sectional view showing a vibration-proof ring applied to the alternator according to an embodiment 9 of the present invention.
Figure 16:
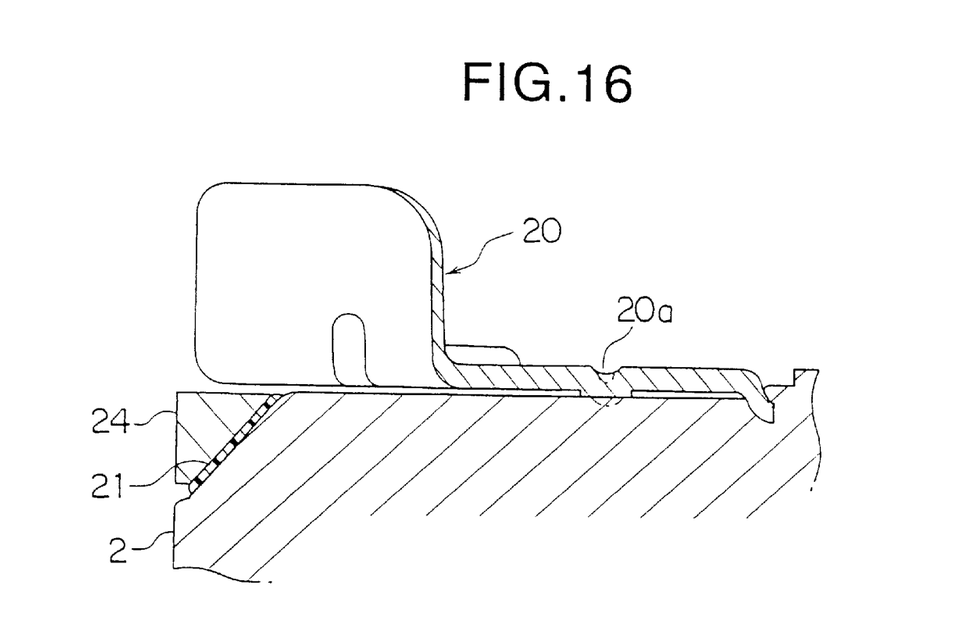
FIG. 16 is a sectional view of the main portion of the vibration-proof ring in the alternator according to the embodiment 9 of the present invention and shows how the vibration-proof ring is mounted.

In an embodiment 9, a vibration-proof ring 24 is mounted to each of poles 2 by being welded to the outer peripheral edge of the pole 2 on the side of a fan 20 and an elastic matter 21 is interposed between the pole 2 and the vibration-proof ring 24 as shown in FIG. 16. The vibration-proof ring 24 is made in such a manner that the inner peripheral surface of a ring body made of a steel material is cut to the shape which conforms to the inclination of the outer peripheral edge of the pole 2 on the fan 20 side as shown in FIG. 15. The other arrangement of the embodiment 9 is the same as that of the embodiment 1.

In the embodiment 9, since the vibration-proof rings 24 are mounted to the poles 2 by being welded to the outer peripheral edges thereof on the fan 20 side, the magnetic vibration of the poles 2 is suppressed. Further, the magnetic vibration of the poles 2 is suppressed by the damper effect obtained from the elasticity of the elastic matters 21. The vibration-proof rings 24 need not be made of the steel material but they may be made of a material such as a resin or the like having a sufficient rigidity.

As described above, according to the present invention, since the elastic matters are interposed between the fans and the poles on the outer peripheral side of the welding positions where the fans are welded to the poles in a vehicle alternator arranged such that the steel sheet fans are mounted to the poles by being welding to the end surfaces of the poles on the inner peripheral sides of the fans at a plurality of positions in a peripheral direction and a bobbin around which a coil is wound is attached in the poles, there can be obtained the vehicle alternator by which the magnetic vibration of the poles is suppressed by the damper effect of the elastic matters and the electromagnetic noise is suppressed.

Since the plurality of elastic matters are disposed in the peripheral direction in the dot state, all the elastic matters can be interposed between the fans and poles without leaving any space by the deformation of the dot-shaped elastic matters when the fans are mounted to the poles, by which a vibration-proof effect can be securely obtained.

Since the elastic matters are formed in the line state in the peripheral direction, they can be easily formed.

Since the elastic matters are made of the sheet material so as to make the thickness of the elastic matters uniform, a vibration-proof effect can be securely obtained as well as the elastic matters can be easily formed, by which productivity can be improved.

Since the thickness of the elastic matters on the outer peripheral side thereof is made thicker than that on the inner peripheral side thereof, a pressurizing force acting on the outside diameter side of the poles having a large amplitude is increased, by which the magnetic vibration of the poles can be suppressed.

Since the regions of the poles which comes into contact with the elastic matters are formed to the fine irregular surfaces, the areas where the elastic matters are in contact with the poles are increased, by which the damper effect of the elastic matters can be improved.

Since the rigidity increasing members are mounted to the fans, the pressurizing force acting on the poles through the elastic matters is increased by the increase of the rigidity of the fans, by which the magnetic vibration of the poles can be suppressed.

According to the present invention, since the vibration-proof rings are mounted to the poles by being welded to the outer peripheral edges of the poles on the fan sides thereof and the elastic matters are interposed between the poles and the vibration-proof rings in the vehicle alternator arranged such that the steel sheet fans are mounted to the poles by being welding to the end surfaces of the poles on the inner peripheral sides of the fans at a plurality of positions in a peripheral direction and a bobbin around which a coil is wound is attached in the poles, there can be obtained the vehicle alternator by which the magnetic vibration of the poles is suppressed by the damper effect of the elastic matters and the electromagnetic noise is reduced.

Further, according to the present invention, since the paste of the elastic material is applied to the fans on the outer peripheral side of the positions where the fans are welded to the poles and the fans are integrated with the poles by being welded thereto while the coated surfaces of the elastic materials are pressed against the end surfaces of the poles and thereafter the elastic materials are cured, the elastic materials are filled between the fans and the poles without leaving any space. As a result, there can be obtained a method of manufacturing the vehicle alternator having the secure vibration-proof effect.

What is claimed is:

1. A vehicle alternator including steel sheet fans mounted to poles by welding to end surfaces of the poles on inner peripheral sides of the fans at a plurality of positions in a peripheral direction and a bobbin around which a coil is wound and which is attached in the poles, comprising elastic matters interposed in a compressed state between the fans and the poles on an outer peripheral side of welding positions where the fans are welded to the poles.

2. A vehicle alternator according to claim 1, wherein a plurality of said elastic matters are disposed in a dot state in a peripheral direction.

3. A vehicle alternator according to claim 1, wherein said elastic matters are disposed in a line state in a peripheral direction.

4. A vehicle alternator according to claim 1, wherein said elastic matters are made of a sheet material.

5. A vehicle alternator according to claim 1, wherein the regions where the poles come into contact with the elastic matters are formed to a fine irregular surface.

6. A vehicle alternator according to claim 1, wherein rigidity increasing members are mounted to the fans.

7. A vehicle alternator including steel sheet fans mounted to poles by welding to end surfaces of the poles on inner peripheral sides of the fans at a plurality of positions in a peripheral direction and a bobbin around which a coil is wound and which is attached in the poles, comprising elastic matters interposed between the fans and the poles on an outer peripheral side of welding positions where the fans are welded to the poles, wherein the thickness of said elastic matters on the outer peripheral side thereof is made thicker than that on the inner peripheral side thereof.

8. A vehicle alternator including steel sheet fans mounted to poles by welding to end surfaces of the poles on inner peripheral sides thereof at a plurality of positions in a peripheral direction and a bobbin around which a coil is wound and which is attached in the poles, comprising: vibration-proof rings mounted to outer peripheral edges of the poles on the fan side thereof; and elastic matters interposed between the poles and the vibration-proof rings.

9. A method of manufacturing a vehicle alternator, comprising the steps of:

applying a paste of an elastic material to steel sheet fans on an outer peripheral side of welding positions where the fans are welded to poles;

curing the elastic material applied on the fans; and welding the fans to the poles while pressing the coated surfaces of the elastic material against end surfaces of the poles to integrate the fans and the poles with the cured elastic material interposed in a compressed state between the fans and the poles.

10. A vehicle alternator comprising:

a plurality of claw-shaped poles;

a bobbin around which a coil is wound, said bobbin attached to said claw-shaped poles; and a plurality of fans attached to said claw-shaped poles, each said fan having a single-piece construction formed from a steel sheet with a fan portion and a disc portion, said fan portion projecting from an outer peripheral edge of a first lateral surface of said disc portion, each said fan having a plurality of protrusions projecting from a second lateral surface of said disc portion, opposite said first lateral surface, near an inner peripheral edge of said disc portion, operative for being welded to said claw-shaped poles, each said fan including elastic matters attached to said second lateral surface of said disc portion near said outer peripheral edge, wherein said second lateral surfaces of said disc portions of said plurality of fans are press-fitted to end surfaces of said claw-shaped poles thereby deforming said elastic matters so that said elastic matter are interposed in a compressed state between said fans and said claw-shaped poles, and said plurality of fans are attached to said claw-shaped poles by welding at said plurality of protrusions.

11. A vehicle alternator according to claim 10, wherein a plurality of said elastic matters are disposed in a dot-shape in a peripheral direction.

12. A vehicle alternator according to claim 10, wherein said elastic matters are disposed in a line-shape in a peripheral direction.

13. A vehicle alternator according to claim 10, wherein said elastic matters are made of a sheet material.

14. A vehicle alternator according to claim 10, wherein the regions where the poles come into contact with the elastic matters have a fine irregular surface.

15. A vehicle alternator according to claim 10, wherein rigidity increasing members are mounted to the fans.

16. A vehicle alternator comprising:

a plurality of claw-shaped poles;

a bobbin around which a coil is wound, said bobbin attached to said claw-shaped poles; and a plurality of fans attached to said claw-shaped poles, each said fan having a single-piece construction formed from a steel sheet with a fan portion and a disc portion, said fan portion projecting from an outer peripheral edge of a first lateral surface of said disc portion, each said fan having a plurality of protrusions projecting from a second lateral surface of said disc portion, opposite said first lateral surface, near an inner peripheral edge of said disc portion, operative for being welded to said claw-shaped poles, each said fan including elastic matters attached to said second lateral surface of said disc portion near said outer peripheral edge, wherein said second lateral surfaces of said disc portions of said plurality of fans are press-fitted to end surfaces of said claw-shaped poles thereby deforming said elastic matters, and said plurality of fans are attached to said claw-shaped poles by welding at said plurality of protrusions and the thickness of said elastic matters on the outer peripheral side thereof is made thicker than that on the inner peripheral side thereof.

* * * * *